Figure 1:
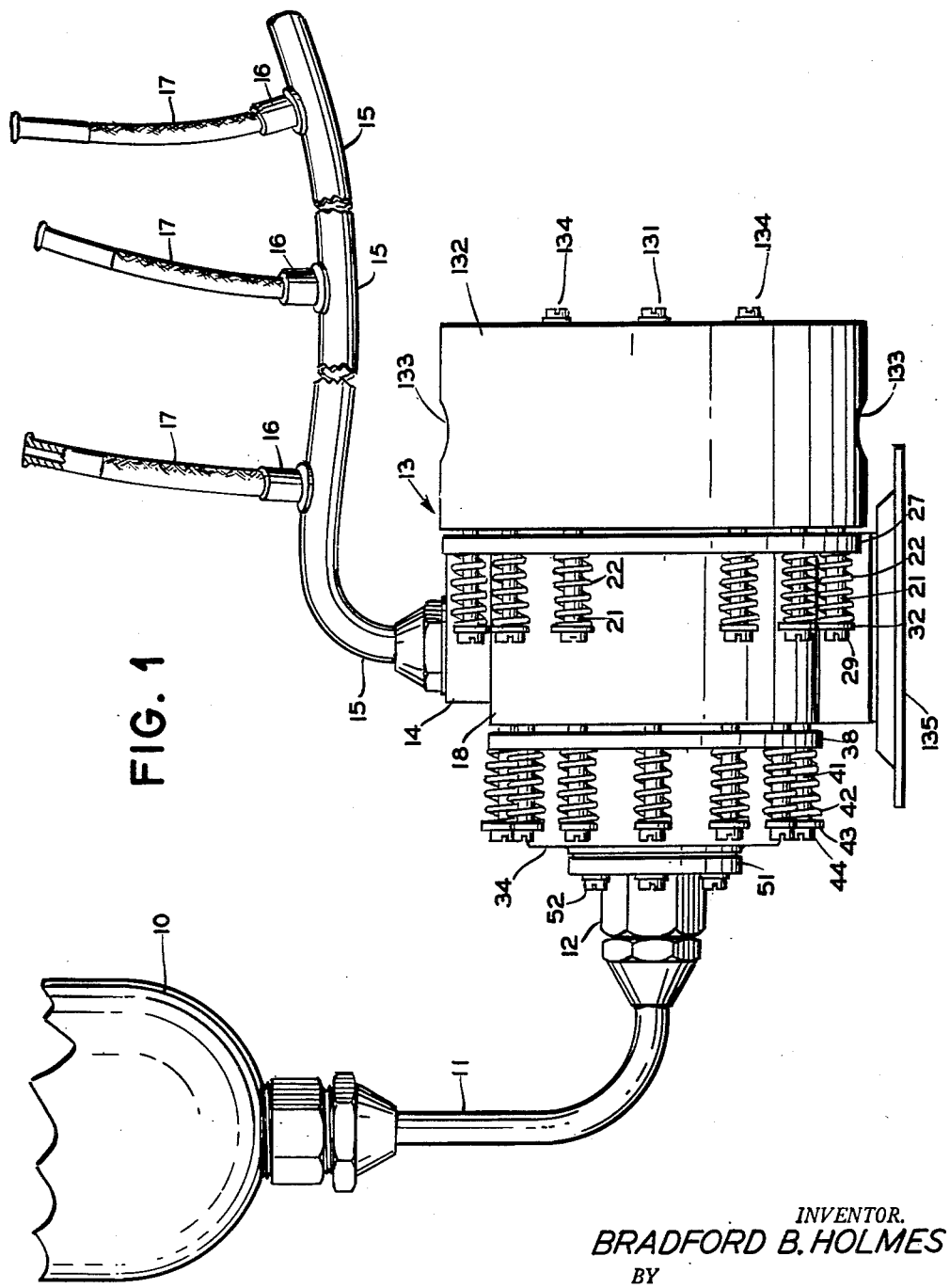

May 27, 1958 B. B. HOLMES 2,836,189
OXYGEN REGULATOR

Filed July 17, 1952 2 Sheets-Sheet 1

INVENTOR.
BRADFORD B. HOLMES
BY
ATTORNEY

May 27, 1958  B. B. HOLMES  2,836,189
OXYGEN REGULATOR
Filed July 17, 1952  2 Sheets-Sheet 2

INVENTOR.
BRADFORD B. HOLMES
BY
ATTORNEY

United States Patent Office 2,836,189
Patented May 27, 1958

2,836,189
OXYGEN REGULATOR

Bradford B. Holmes, New York, N. Y., assignor to Bendix Aviation Corporation, Teterboro, N. J., a corporation of Delaware Application July 17, 1952, Serial No. 299,352

15 Claims. (Cl. 137—64)

In general, the present invention relates to fluid regulating apparatus and more particularly has to do with apparatus for regulating the delivery of a respirant gas, such as oxygen, to the occupant of an aircraft traversing high altitudes.

It has been found that in order to maintain normal human efficiency during continued flights above an altitude of about ten thousand feet, it is necessary to supply oxygen to the occupant of the aircraft to make up for the deficiency in the oxygen content of the ambient atmosphere at these altitudes. To that end, aircraft designed for high altitude flight usually are equipped with an oxygen system designed and constructed to deliver oxygen in desirable quantities to the occupants of the craft during flight at high altitude.

One type of oxygen system presently used in aircraft, and which is particularly suited to supply oxygen to a large number of occupants, includes one or more tanks containing oxygen under a relatively high pressure and connected through suitable conduits to the inlet of a continuous flow regulator which operates to reduce the pressure of the oxygen to a desired value. The regulator outlet is connected to a main supply conduit or manifold having a plurality of individual outlets or stations, each of which includes suitable orifice means for metering the flow of oxygen from the manifold to individual supply conduits connected to the outlet stations.

The present invention contemplates and has for one of its objects a novel regulator adapted for use in an oxygen system of the type above described and which serves to control the pressure of the oxygen delivered to the manifold.

In an oxygen system of the above type, the quantity of oxygen delivered through each outlet station is a function of the pressure of the oxygen in the manifold. Moreover, there may be as many as one hundred individual outlet stations in the system. The novel regulator contemplated herein therefore embodies means whereby the pressure of the oxygen at the outlet of the regulator, and hence in the manifold, is maintained at a substantially constant value even though a relatively large flow of oxygen through the regulator and manifold is required to supply each individual outlet station with the proper quantity of oxygen. Thus, by maintaining the pressure of the oxygen in the manifold at a substantially constant value irrespective of flow therethrough, the present regulator assures the delivery of the proper amount of oxygen to each occupant of the aircraft.

It is well known that the oxygen content of the atmosphere at high altitudes is less than that at low altitudes and that this decrease in the oxygen content of the atmosphere is inversely proportional to altitude. In short, as altitude increases, the quantity of oxygen in the atmosphere decreases. The novel regulator contemplated herein, therefore, embodies means whereby the pressure of the oxygen in the outlet of the regulator, and hence in the manifold, is automatically increased as a function of increasing altitude to the end that a greater quantity of oxygen is delivered through the outlet stations to the occupants as altitude increases. Thus, by providing for a progressive increase in the pressure of the oxygen in the manifold as altitude increases, a progressively larger quantity of oxygen is delivered to the occupants as altitude increases. The instant regulator therefore assures the delivery of the proper quantity of oxygen to the occupants to make up for the increasing deficiency of the oxygen content of the atmosphere as altitude increases.

The regulator contemplated herein also incorporates novel means whereby excessive pressure within the regulator may be vented. Thus, in the event the regulator should malfunction and build up an excessive pressure therewithin, the regulator casing is so constructed and arranged as to vent the excessive pressure to the ambient atmosphere.

The above and other objects and advantages of the instant invention will become apparent to those skilled in the art from the following description taken in conjunction with the accompanying drawings wherein one form of the novel regulator contemplated herein is illustrated by way of example. It is to be expressly understood, however, that the drawings are for the purpose of illustration only and are not to be construed as limiting the scope of the instant invention.

Figure 2:
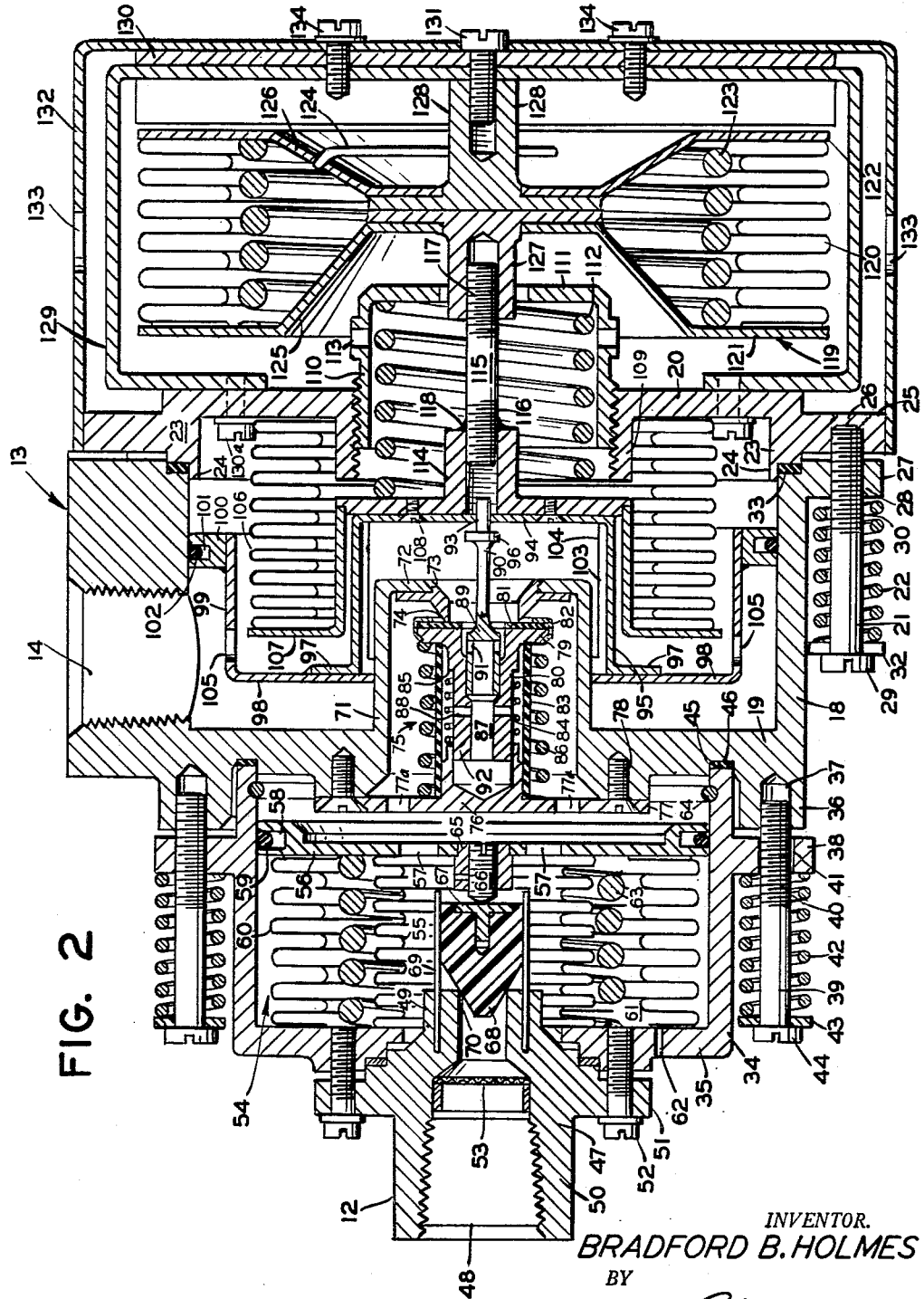

Referring now to the drawings wherein like reference characters designate like parts throughout the various views:

Figure 1 is a fragmentary elevational view of an oxygen system of the type hereinbefore set forth, showing the novel regulator contemplated herein connected to the oxygen tanks and the manifold of the system; and Figure 2 is a central longitudinal section through the novel regulator.

Referring now to Figure 1 of the drawings, the reference character 10 designates a tank containing oxygen under a relatively high pressure. A suitable conduit 11 connects tank 10 to the inlet 12 of the novel regulator contemplated herein, generally indicated by the reference character 13, while the outlet 14 of regulator 13 is connected to a manifold or main supply conduit 15. Manifold 15 is provided with a plurality of individual outlet stations 16 to which are connected individual supply means 17. Each outlet station 16 includes an orifice and one way check valve downstream of the orifice (not shown) which normally closes the outlet station and which is opened upon the connection of supply means 17 thereto.

Referring now to Figure 2, regulator 13 includes a casing having a substantially cylindrical hollow body which forms a main or outlet section 18. At one end, section 18 is closed by a fixed end wall 19 while the other end thereof is provided with an end wall 20 that is resiliently mounted to section 18 by means of a plurality of bolts 21 and springs 22. More particularly, section 18 is recessed at the open end thereof to form an internal annular shoulder, and end wall 20 has formed thereon an annular extension 23 having an annular lip portion 24 slidable within the open end of section 18 and a shoulder adapted to engage the shoulder formed in the open end of section 18. Thus, lip portion 24 of wall 20 is adapted to telescopingly engage the open end of section 18.

To resiliently secure end wall 20 to section 18 so as to permit the former to move away from the latter, end wall 20 is provided with an outstanding peripheral flange 25 in which is formed a plurality of internally threaded sockets 26. Section 18 is also provided with the peripheral flange 27 and openings 28 are formed in this flange to register with the threaded sockets 26 in flange 25. Bolts 21 each having a head end 29 and an externally threaded end 30 are mounted to flange 25 by passing the threaded ends 30 thereof through the openings 28 in flange 27 and engaging the same with the registered threaded socket 26 in flange 25. The relative diameters of bolts 21 and openings 28 are such as to permit a sliding fit therebetween. Each bolt 21 is provided with a spring 22 that encircles the bolt and is operative between flange 27 and a washer 32 abutting head 29 to urge the bolt, and hence end wall 20, in a direction where the later engages section 18. A sealing gasket 33, of suitable material, is interposed between the shoulders formed in the open end of section 18 and extension 23 of end wall 20.

The casing of regulator 13 also includes a substantially cylindrical hollow body, which forms an end or inlet section 34. At one end, section 34 is closed by an end wall 35 while the opposite, or open end thereof is adapted to be mounted to and closed by end wall 19 of outlet section 18. Inlet section 34 is mounted to end wall 19 in a manner similar to the mounting of end wall 20 to outlet section 18. Thus, end wall 19 is provided with an annular boss 36 in which is formed a plurality of internally threaded sockets 37. Section 34 is provided with a peripheral flange 38 adjacent the open end thereof and bolts 39 are mounted to end wall 19 by passing the externally threaded ends 40 thereof through openings 41 in flange 38 and engaging the same with sockets 37 in boss 36. Each bolt 39 is provided with a spring 42 that is operative between a washer 43 engaged with the head 44 of the bolt and flange 38 to urge the open end of section 34 into an annular groove 45 formed in end wall 19. A suitable sealing gasket 46 is positioned in groove 45 between the end of section 34 and the transverse wall of groove 45. The relative diameters of bolts 39 and openings 41 in flange 38 afford a sliding fit between these elements, and due to this construction, end section 34 is resiliently mounted to section 18.

Inlet 12 of regulator 13 includes a fitting 47 having a through bore 48. The inner end portion 49 of fitting 47 extends through an aperture in wall 35 into the interior of section 34 and the outer end portion 50 of fitting 47 is connected to conduit 11. A flange 51 on fitting 47 is secured by bolts 52 to end wall 35. A filter 53 positioned within bore 48 serves to prevent foreign matter from passing into the interior of regulator 13.

To control the flow of oxygen through inlet 12 and to reduce its pressure to a first predetermined value, a first pressure reducing assembly generally indicated by the reference character 54 is mounted within end section 34.

More particularly, a first or inner bellows 55 is sealingly secured at one end to end wall 35 so as to be concentrically disposed about inner end 49 of fitting 47 and to extend into end section 34. The other or inner end of bellows 55 is sealingly secured to a plate 56 slidably mounted in end section 34. Plate 56 is provided with a plurality of ports 57 through which the oxygen entering the interior of bellows 55 from inlet fitting 47 may pass. Although plate 56 is slidable within section 34 a clearance is provided between the edge of plate 56 and the inner wall of end section 34 so as to permit pressure to pass therebetween. To prevent undesirable "chatter" of plate 56, an annular channel 58 formed in the edge thereof has operatively positioned therein a resilient ring 59. It is to be noted that the diameter of the inner wall of section 34 relative to the outer diameter of ring 59 is such that latter only lightly contacts or rubs against the inner wall of section 34 to prevent plate 56 from chattering. Moreover, ring 59 is free to move inwardly into groove 58 so that it does not prevent pressure from passing between ring 59 and the adjacent surface of the inner wall of section 34. A second or outer bellows 60, concentrically disposed about inner bellows 55, is sealingly fastened at its opposite ends to end wall 35 and plate 56. Outer bellows 60 is spaced from inner bellows 55 to the end that a chamber 61 is defined between the adjacent surfaces thereof. Chamber 61 communicates through a passageway 62 formed in end wall 35 with the exterior of regulator 13. A spring 63, encircling inner bellows 55 and positioned in chamber 61, is operative between end wall 35 and plate 56 to impose a force or load on the latter tending to expand bellows 55 and 60. A snap ring 64 mounted in end section 34 adjacent its open end and engageable by plate 56 limits the expansion of the bellows 55 and 60.

Plate 56 has secured to the central portion thereof an internally threaded collar 65 in which is operatively positioned an adjusting screw 66. Collar 65 and screw 66 extend into the interior of bellows 55 where the end of the screw engages a reenforcing or bearing plate 67 inserted in the end of a frusto-conical valve member 68. Valve member 68 is slidably mounted in guide rods 69 carried by the inner end 49 of inlet fitting 47 and engages a valve seat 70 formed on the inner end of bore 48.

Due to the foregoing construction and arrangement of parts, the interior of bellows 55 and the exterior of bellows 60 are exposed to the pressure within end section 34, while the exterior of bellows 55 and the interior of bellows 60 are exposed to the pressure of the ambient atmosphere. Therefore, bellows 55 and 60 and plate 56 cooperate in such a manner so that the latter, in effect, becomes a pressure responsive member or diaphragm having an effective area equal to the difference between the effective areas of the bellows and which is responsive to the pressure differential between the pressures within end section 34 and the ambient atmosphere. Thus, upon an increase of the pressure within end section 34 above ambient atmospheric pressure the resulting pressure differential is operative on the effective area of plate 56 to move plate 56 in a direction to compress bellows 55 and 60 against the biasing force of spring 63. The effective area of plate 56 and hence the force produced thereby in response to a pressure differential as aforesaid, is determined by the relative effective areas of bellows 55 and 60. Therefore, by providing a suitable effective area for each bellows, plate 56 can be made to produce a predetermined force in response to a pretermined pressure within end section 34 that balances the force imposed on plate 56 by spring 63 to the end that the former assumes a given position within end section 34 relative to valve seat 70.

Before oxygen is supplied to inlet 47, the pressure within end section 34 is in balance with ambient atmospheric pressure and, therefore, spring 63 moves plate 56 so as to fully expand bellows 55 and 60. When oxygen under pressure is supplied to inlet 12 it passes through bore 48 and moves valve member 68 inwardly on rods 69 until bearing plate 67 engages adjusting screw 66 on plate 56. The oxygen passes through the interior of bellows 55, ports 57 and around the edges of plate 56 within end section 34. As the pressure within end section 34 increases above atmospheric pressure, the pressure differential occasioned thereby produces a force on plate 56 that moves the latter and hence valve member 68 in the direction of valve seat 70 against the biasing force of spring 63 and the force produced by the oxygen pressure acting on valve member 68. Valve member 68 is thereby adjusted relative to its coacting seat 70 so as to maintain the pressure within inlet section 34 within predetermined values determined by the pressure of the oxygen at the inlet 12. The oxygen pressure within end section 34 is maintained at a value sufficient to provide for the maximum flow requirements of regulator 13.

To afford means whereby oxygen at predetermined pressures, which progressively increase as altitude increases, is made available at outlet 14 irrespective of the flow therethrough, regulator 13 is provided with a second pressure reducing assembly that is operative in response to the pressure of the oxygen in main section 18 and to ambient atmospheric pressure.

More particularly, the central portion of end wall 19 is provided with a cylindrical extension 71 which extends partially into the interior of outlet section 18. At its outer end cylinder 71 is open to the interior of end section 34. At its inner end, cylinder 71 is provided with an end wall 72 having an orifice 73 provided with a knife-edge valve seat 74 and serving as an inlet for main section 18.

Flow through orifice 73 is controlled by a balanced valve 75 which includes, in addition to valve seat 74, a hollow cylindrical guide 76 extending into cylinder 71 and held in axial alignment with seat 74 by a member 77 secured by bolts 78 to end wall 19 and provided with suitable openings 77a, a valve disc 79 having stem 80 slidably mounted in guide 76 and a resilient face 81 secured to disc 79 by a clamp 82. To seal the interior of guide 76 from the oxygen in cylinder 71, a resilient sleeve 83 is sealingly secured at its opposite ends to the exterior surface of guide 76 and to the lower portion of stem 80 to enclose the same. To prevent sleeve 83 from being forced into contact with the central portion of stem 80, a small light spring 84 is positioned between a shoulder 85 formed on stem 80 and the inner end of guide 76. A spring 86 encircling sleeve 83 and operative between member 77 and valve disc 79 normally urges the latter in a direction to engage the resilient face 81 thereof with valve seat 74. Disc 79, the resilient face 81 thereof and stem 80 are provided with a through bore 87, and stem 80 is provided with a transverse bore 88 which communicates bore 87 with the space between sleeve 83 and stem 80. The end of bore 87 adjacent disc 79 is enlarged to form a socket in which is received the enlarged hollow end member 89 of an actuating rod 90. Suitable openings 91 formed in member 89 serve to communicate bore 87 with the downstream side of orifice 73 when valve disc 79 is engaged with its coacting seat 74.

When disc 79 is engaged with seat 74, the central area of face 81 is exposed to the relatively low pressure at the downstream side of orifice 73. The force thus produced is balanced by an equal and opposite force acting on the end 92 of stem 80, because this low pressure is also communicated through openings 91 and bore 87 to the interior of guide 76 where it is oppositely effective on the end 92 of stem 80. The area of end 92 of stem 80 is designed so as to be equal to the cross-sectional area of orifice 73. Therefore, since the area of end 92 and central area of face 81 are substantially equal it is manifest the forces produced thereon by the low pressure are substantially equal and therefore balance each other, or cancel out. Similarly, the high pressure on the upstream side of orifice 73 is effective on equal, oppositely disposed surfaces of valve disc 79. Therefore the forces produced on valve 75 by both the high pressure in cylinder 71 and the low pressure downstream of orifice 73 are effectively balanced or cancelled out, and valve 75 is responsive solely to the force exerted thereon by springs 84 and 86. Since the force exerted by spring 84 is negligible, the force of spring 86 is, in effect, the only force that tends to hold the face 81 of valve disc 79 in engagement with its coacting seat 74.

Rod 90 extends through orifice 73 into main section 18, where its opposite end 93 is slidably mounted in an end wall 94 of a hat-shaped member 95. A shoulder 96 formed on rod 90 is adapted to be engaged by end wall 94. Member 95 is provided with a peripheral flange 97 welded or otherwise suitably secured to a cup-shaped pressure plate 98 slidably mounted within main section 18. More particularly, pressure plate 98 is centrally apertured so as to be slidably mounted on outer surface of cylinder 71, and the cylindrical side wall 99 thereof is provided with a flange 100 slidably engaging the inner wall of main section 18. An annular channel or groove 101 is formed in flange 100 and mounts a resilient ring 102 which engages the inner wall of main section 18 to prevent undesirable chatter of plate 98.

Orifice 73 communicates with the interior of hat-shaped member 95. To provide communication between orifice 73 and outlet 14, the cylindrical side wall 103 of member 95 is pierced by ports 104 and side wall 99 of plate 98 has formed therein a plurality of orifices 105. In the form illustrated, ports 104 are large, the single port shown in Fig. 2 extending across almost the entire rear area of side wall 103. Thus, oxygen can flow from orifice 73 through ports 104 and orifices 105 to outlet 14. In designing orifices 105, the leakage around the inner and outer edge of plate 98 are taken into consideration. For purposes that will hereinafter be more fully set forth, orifices 105 are designed to the end that the sum of the cross-sectional areas thereof is sufficient to readily accommodate the flow of oxygen below a predetermined value, but at flows above this value, the orifices serve to restrict the flow and produce a pressure differential between opposite sides of pressure plate 98.

A bellows 106 is sealingly secured at one of its ends to end wall 20, extends inwardly into section 18 and has its opposite end closed by an end plate 107. End plate 107 is similar in form to hat-shaped member 95, and is secured to end wall 94 of the latter by suitable fastening means such as screws 108. End wall 20 has an axially extending internally threaded collar 109 which extends inwardly into bellows 106 and mounts an externally threaded cap 110 having a centrally apertured end wall 111 at its outer end. A spring 112 is operative between end plate 107 and end wall 111 to urge plate 107 toward valve 75. Cap 110 is provided with openings 113 for receiving a suitable tool to rotate cap 110 in collar 109 and adjust the force exerted by spring 112 on end plate 107.

End plate 107 is provided with an internally threaded extension 114 extending in the direction of the aperture in end wall 111 of cap 110 and is positioned in axial alignment therewith. A rod 115, having externally threaded opposite ends 116 and 117 has one end threaded in extension 114 and a suitable sealant 118 applied to the threads prevents leakage about the threads. The opposite end 117 of rod 115 is screwed to an aneroid assembly 119 which includes a bellows 120 sealingly secured at its opposite ends to end plates 121 and 122. A spring 123 is operatively positioned within bellows 120 between end plates 121 and 122. The interior of bellows 120 is evacuated through suitable means such as tube 124 to establish a base or reference pressure having a value substantially close to zero. End plates 121 and 122 have central portions 125 and 126 extending inwardly into bellows 120, to the end that when bellows 120 is contracted as will hereafter be more fully set forth, central portions 125 and 126 engage to limit the contraction of bellows 120. The central portion 125 of end plate 121 is provided with an internally threaded extension 127 that extends through the aperture in end wall 111 of cap 110 where it is mounted to the threaded end 117 of rod 115. Central portion 126 of end plate 122 is also provided with an internally threaded extension 128. A yoke 129 having a reinforcing channel member 130 is secured to the outer surface of end wall 20 by suitable means such as bolts 130a. A bolt 131 passing through suitable openings in channel member 130 and yoke 129 engages the internal threads of extension 128 to secure aneroid assembly 119 to yoke 129. End plate 122, therefore, is mounted in a fixed position and any expansion or contraction of bellows 120 serves to move only end plate 121 toward or away from end plate 122.

To protect aneroid assembly 119 from damage, a cover 132 having suitable vent passages 133 formed therein is secured by bolts 134 to yoke 129 and channel member 130. A mounting flange 135 (Figure 1), secured to outlet section 18 by suitable means (not shown), affords means whereby regulator 13 may be mounted in an aircraft.

Due to the foregoing construction and arrangement of parts, springs 112 and 123 acting on end plates 107 and 121, respectively, exert a force tending to move member 95 in a direction whereby end wall 94 thereof engages shoulder 96 of rod 90 to move the latter to disengage valve disc 79 from its coacting seat 74 to open valve 75. Moreover, by rotating cap 110 in the manner described above the force exerted by springs 112 and 123 is adjustable to a preselected value.

The interior of bellows 120 is evacuated through tube 124 to establish therein a basic pressure substantially close to zero, while the exterior of bellows 120 is exposed to ambient atmospheric pressure by virtue of vent passages 133 in cover 132. The effective area of bellows 120 is such that at sea level the pressure differential between ambient atmospheric pressure and the base pressure produces a force on end plate 121 of sufficient magnitude to compress bellows 120 and move end plate 121 into engagement with end plate 122. This movement of end plate 121 compresses spring 123 and is transmitted through rod 115 to end plate 107 to the end that bellows 106 and spring 112 are also compressed and end wall 94 of member 95 is moved out of contact with shoulder 96 of rod 90, thereby permitting spring 86 to close valve 75.

The pressure of the ambient atmosphere decreases as a function of increasing altitude; therefore, as altitude increases the force on bellows 120 also decreases. At a first predetermined altitude, the force exerted by springs 112 and 123 is greater than the force of the atmosphere on bellows 120, and end plate 121 and member 95 are moved until end wall 94 engages shoulder 96 of rod 90 to open valve 75. Bellows 120 and springs 112 and 123, therefore, are operative in response to increasing altitude to open valve 75 and permit the oxygen under pressure to flow from inlet section 34 into the interior of member 95, from whence it passes through ports 104, orifice 105 and outlet 14 into manifold 15. Thus, bellows 120 and springs 112 and 123 cooperate to provide a net force that increases in value as a function of increasing altitude and which adjusts valve 75 to provide for increased flow therethrough as a function of increasing altitude.

The foregoing operation of valve 75 is modified by bellows 106 and pressure plate 98 in the following manner. The interior of bellows 106 communicates with ambient atmosphere through openings 113 and the central aperture in end wall 111 of cap 110, while the exterior thereof is exposed to the pressure in outlet section 18. When valve 75 opens permitting oxygen to enter outlet section 18 the initial flow is at a relatively low value and is readily accommodated by orifices 105 of pressure plate 98. The oxygen, therefore, passes through orifices 105 and outlet 14 into manifold 15 without effecting a pressure differential between opposite sides of pressure plate 98.

Assuming now that outlet stations 16 are closed, the oxygen pressure builds up in manifold 15 and hence outlet section 18 with the result that a pressure differential is produced between the pressure outlet section 18 and the ambient atmospheric pressure. This pressure differential is operative on the effective area of bellows 106 to produce a force on end plate 107 that tends to move the same in direction to oppose the force of springs 112 and 123. By providing bellows 106 with a suitable effective area relative to the effective area of bellows 120, the force produced by the former in response to a given pressure differential between the pressure in outlet section 18 and ambient atmospheric pressure is operative to balance the force of springs 112 and 123 as modified by the action of bellows 120 as above set forth. Thus, as altitude increases the forces produced by bellows 106 and 120 cooperate to modify the force of springs 112 and 123 to the end that at any given altitude above the altitude at which valve 75 opens, valve 75 is adjusted to maintain a given pressure within outlet section 18 and hence within manifold 15.

When one or more of the outlet stations are placed into use, oxygen flows from manifold 15 through the outlet station 16 and supply means 17 to the occupant. In response to the flow thus produced, bellows 106 and 120 and springs 112 and 123 operate valve 75 as hereinbefore set forth to maintain the pressure of the oxygen in outlet section 18 and hence manifold 15 at a value which, although substantially constant at any given altitude, increases with increasing altitude. Thus, flow through regulator 13 increases as altitude increases, and larger quantities of oxygen are delivered through outlet stations 16 as altitude increases.

At any altitude, after valve 75 opens, when the flow of oxygen is increased due to a larger number of outlet stations 16 being placed in use, orifices 105 serve as hereinbefore set forth, to produce a pressure differential between opposite sides of pressure plate 98 which moves the pressure plate toward valve 75. The force exerted on pressure plate 98 is transmitted through member 95 to rod 90 where it is added to the force exerted by springs 112 and 123. Valve 75 is therefore adjusted to permit a larger flow of oxygen through orifice 73 and hence through outlet section 18 and manifold 15 to the outlet station 16 to the end that the pressure of the oxygen in outlet 14 remains at a substantially constant value even though a large flow of oxygen is required to supply outlet stations 16.

As hereinbefore set forth, inlet section 34 is resiliently mounted by bolts 30 and springs 42 to end wall 19 of outlet section 18. In the event the pressure within inlet section 34 increases to a point where the force produced thereby on end wall 35 exceeds the combined force exerted by springs 42, inlet section 34 will be moved away from end wall 19 thus venting the interior of inlet section 34 to atmosphere. Similarly, if the pressure within outlet section 18 increases to a value where the force produced thereby on end wall 20 exceeds the combined forces of springs 31, end wall 20 will be moved away from outlet section 18 to the end that the interior of the latter is vented to atmosphere. By providing for the venting of sections 18 and 34, damage is prevented to bellows 106 and 120, and 55 and 60 respectively, in the event valves 75 or 68 should leak.

Due to the foregoing construction and operation, when regulator 13 is at sea level valve 75 of the second pressure reducer assembly remains closed. Therefore, when oxygen is delivered from tank 10 through conduit 11 to inlet 12 of regulator 13, first pressure reducer assembly 54 reduces the pressure of the oxygen to establish and maintain an oxygen pressure in inlet section 34 of a predetermined value.

At altitudes above sea level, the second pressure reducer assembly operates in response to decreasing ambient atmospheric pressure to adjust valve 75 to the end that oxygen under pressure is delivered from inlet section 34 to outlet section 18, and through outlet 14 to manifold 15 where it is made available at outlet stations 16. Moreover, the pressure of the oxygen delivered to manifold 15 increases as a function of increasing altitude to thereby insure the delivery of the proper quantity of oxygen through outlet stations 16 to the occupants using outlet means 17. If at any altitude increased oxygen flow through regulator 13 is required to supply the outlet stations 16, for example when a large number of stations are in use, pressure plate 98 serves to adjust valve 75 to accommodate this increased flow requirement.

Having thus described the details of construction and operation of the novel regulator contemplated herein, it will be apparent to those skilled in the art that various objects of the instant invention, hereinbefore set forth, have been achieved. Furthermore, it will be apparent to those skilled in the art, that by varying the relative areas of bellows 106 and 120 any desired increase in the pressure of the oxygen in outlet section 18 can be achieved for any increase in altitude. Moreover, due to the construction and arrangement of the first and second pressure reducer assemblies and the control of the latter by pressure plate 98, the oxygen pressure in outlet 18 at any given altitude is substantially unaffected by the pressure of the oxygen at inlet 12 or the number of outlet stations 16 that are in use.

While only one embodiment of the instant invention has been illustrated and described, various changes or modifications in the construction and arrangement of the parts, which will be apparent to those skilled in the art, may be made without departing from the scope of the invention.

What is claimed is:

1. A continuous flow oxygen regulator comprising a casing having inlet and outlet sections, valve means controlling flow between said inlet and outlet sections, means responsive to increasing altitude to adjust said valve means to increase flow therethrough as a function of increasing altitude, and flow responsive means, having a response produced only by flow above a predetermined value, for further adjusting said valve means to increase flow therethrough in accordance with such response.

2. A continuous flow oxygen regulator comprising a casing including an inlet section having inlet means to receive oxygen under pressure, and an outlet section having an outlet, pressure reducer means in said inlet section constructed and arranged to control oxygen flow through said inlet means to maintain the oxygen in said inlet section at a substantially constant pressure, valve means communicating said inlet and outlet sections, altitude responsive means connectable with said valve means and responsive to increasing altitude to adjust said valve means to increase flow therethrough as a function of increasing altitude, and means connected to said altitude responsive means and having a response produced only by flow above a predetermined value, for further adjusting said valve means to increase flow therethrough in accordance with such response.

3. A regulator for controlling the flow of oxygen from a source of pressurized oxygen to a manifold, said regulator comprising a casing having inlet and outlet sections, an inlet for said inlet section adapted for connection to the source of oxygen, and an outlet for said outlet section adapted for connection to the manifold, a pressure reducer assembly in said inlet section operative in response to a pressure differential between ambient atmospheric pressure and the pressure of the oxygen in said inlet section to maintain the latter pressure at a substantially constant value, inlet means for said outlet section communicating said inlet and outlet sections, valve means controlling oxygen flow through said inlet means, altitude responsive means engageable with said valve means and operable in response to increasing altitude to adjust said valve means to increase oxygen flow through said inlet means as a function of increasing altitude, and means interposed between said inlet means and outlet and connected to said altitude responsive means, having a response to oxygen flow through said inlet means and outlet produced only by flow above a predetermined value, for further adjusting said valve means to increase oxygen flow through said inlet means and outlet in accordance with such response.

4. A regulator for controlling the flow of oxygen from a source of pressurized oxygen to a manifold, said regulator comprising a casing having inlet and outlet sections, an inlet for said inlet section adapted for connection to the source of oxygen, and an outlet for said outlet section adapted for connection to the manifold, a pressure reducer assembly in said inlet section operative in response to a pressure differential between ambient atmospheric pressure and the pressure of the oxygen in said inlet section to maintain the latter pressure at a substantially constant value, inlet means for said outlet section communicating said inlet and outlet sections, valve means controlling oxygen flow through said inlet means, an aneroid assembly carried by said outlet section, a bellows mounted in said outlet section and operatively connected to said aneroid assembly, means communicating the interior of said bellows with the ambient atmosphere, a pressure plate slidably mounted in said outlet section and connected to said bellows, at least one restricted orifice in said pressure plate interposed between said inlet means and outlet, and valve actuating means connecting said bellows to said valve means, said aneroid assembly and bellows being operative in response to variations in altitude to adjust said valve means to control oxygen flow through said inlet means, and said pressure plate and said at least one orifice being operative in response to oxygen flow above a predetermined value through said outlet to said manifold to adjust said valve means to increase oxygen flow through said inlet means.

5. A regulator for controlling the flow of oxygen from a source of pressurized oxygen to a manifold, said regulator comprising a casing having inlet and outlet sections, an inlet for said inlet section adapted for connection to the source of oxygen, and an outlet for said outlet section adapted for connection to the manifold, a pressure reducer assembly in said inlet section operative in response to a pressure differential between ambient atmospheric pressure and the pressure of the oxygen in said inlet section to maintain the latter pressure at a substantially constant value, inlet means for said outlet section communicating said inlet and outlet sections, valve means controlling oxygen flow through said inlet means, altitude responsive means engageable with said valve means and operable in response to increasing altitude to adjust said valve means to increase oxygen flow through said inlet means as a function of increasing altitude, and flow responsive means connected to said altitude responsive means and interposed between said inlet means and outlet, said flow responsive means having a response produced only by oxygen flow between said inlet means and outlet above a predetermined value, for further adjusting said valve means to increase oxygen flow through said inlet means and outlet in accordance with such response.

6. In an oxygen regulator the combination comprising a casing including an inlet section having inlet means connected to a source of oxygen under pressure and an outlet section having an outlet, first pressure responsive means in said inlet section operative in response to the pressure differential between the pressures of the ambient atmosphere and the oxygen within said inlet section to control the flow of oxygen through said inlet means, orifice means communicating said inlet and outlet sections for producing a pressure differential between said sections only at oxygen flows above a predetermined value, second pressure responsive means operative in response to the pressure differential between the pressures of the ambient atmosphere and the oxygen in said outlet section to control the flow of oxygen through said orifice means, and means operatively connected to said second pressure responsive means and responsive to oxygen flow between said orifice means and outlet to control said second pressure responsive means to maintain the pressure of oxygen in said outlet at a substantially constant value irrespective of oxygen flow therethrough.

7. In an oxygen regulator the combination comprising a casing including an inlet section having inlet means connected to a source of oxygen under pressure and an outlet section having an outlet, first pressure responsive means in said inlet section operative in response to the pressure differential between the pressures of the ambient atmosphere and the oxygen within said inlet section to control the flow of oxygen through said inlet means, orifice means communicating said inlet and outlet sections for producing a pressure differential between said sections only at oxygen flows above a predetermined value, valve means engageable with said orifice means to control oxygen flow therethrough, second pressure responsive means operatively connected to said valve means and operative in response to the pressure differential between ambient atmospheric pressure and the pressure of the oxygen in said outlet section to adjust said valve relative to said orifice means whereby the oxygen pressure in said outlet section is increased as a function of increasing altitude, and flow responsive means carried by said second pressure responsive means and actuated by oxygen flow from said orifice means to said outlet above a predetermined value to adjust said valve means to increase flow through said orifice means.

8. In an oxygen regulator the combination comprising a casing including an inlet section having inlet means connected to a source of oxygen under pressure and an outlet section having an outlet, first pressure responsive means in said inlet section operative in response to the pressure differential between the pressures of the ambient atmosphere and the oxygen within said inlet section to control the flow of oxygen through said inlet means, orifice means communicating said inlet and outlet sections for producing a pressure differential between said sections only at oxygen flows above a predetermined value, valve means engageable with said orifice means to control oxygen flow therethrough, means responsive to changes in altitude to adjust said valve relative to said orifice means to thereby vary the pressure of the oxygen in said outlet as a function of altitude, and means connected to said altitude responsive means and operative in response to oxygen flow between said orifice means and outlet to adjust said valve means to increase the flow of oxygen through said outlet.

9. A continuous flow oxygen regulator comprising a casing having an inlet and an outlet, valve means controlling flow between said inlet and outlet, altitude responsive means controlling the adjustment of said valve means to vary flow therethrough as a function of altitude, and means operatively connected to said altitude responsive means and having a response produced only by flow between said inlet and outlet above a predetermined value, for further adjusting said valve means to increase the flow of oxygen through said outlet in accordance with such response.

10. A regulator for controlling the flow of a pressurized fluid from a source thereof to a manifold, said regulator comprising a casing having inlet and outlet sections, an inlet for said inlet section adapted for connection to the source of fluid under pressure, an orifice communicating said inlet and outlet sections, and an outlet for said outlet section adapted for connection to the manifold, pressure reducing means on said inlet section controlling the flow of fluid through said inlet to maintain the fluid pressure in said inlet section at a substantially constant value, and a pressure reducer in said outlet section including flow responsive means having a response produced only by fluid flow between said orifice and outlet above a predetermined value, for further regulating the flow of fluid through said orifice in accordance with said response and thereby maintaining the fluid pressure in said outlet at a substantially constant value irrespective of the flow of fluid to said outlet.

11. In a device for regulating the flow of a pressurized fluid, the combination comprising a casing having an inlet section for receiving a pressurized fluid and an outlet section having an outlet, valve means controlling communication between said inlet and outlet sections, pressure responsive means responsive to a pressure differential between the pressure of the fluid in said outlet section and ambient pressure and engageable with said valve means to adjust said valve means to vary flow therethrough as a function of said pressure differential, and flow responsive means connected to said pressure responsive means and having a response produced only by fluid flow from said valve means to said outlet above a predetermined value, for further adjusting said valve means to increase flow therethrough in accordance with such response.

12. In a device for regulating the flow of a pressurized fluid, the combination comprising a casing having an inlet section for receiving a pressurized fluid and an outlet section having an outlet, valve means controlling communication between said inlet and outlet sections, pressure responsive means responsive to a pressure differential between the pressure of the fluid in said outlet section and ambient pressure and engageable with said valve means to adjust said valve means to vary flow therethrough as a function of said pressure differential, flow responsive means including at least one orifice interposed between said valve means and said outlet, and means connecting said flow responsive means to said pressure responsive means, said flow responsive means having a response produced only by fluid flow from said valve means to said outlet above a predetermined value, for further adjusting said valve means to increase flow therethrough in accordance with such response.

13. In a device for regulating the flow of a pressurized fluid, the combination comprising a casing having an inlet section for receiving a pressurized fluid and an outlet section having an outlet, valve means controlling communication between said inlet and outlet sections, pressure responsive means responsive to a pressure differential between the pressure of the fluid in said outlet section and ambient pressure and engageable with said valve means to adjust said valve means to vary flow therethrough as a function of said pressure differential, and a plate slidably mounted in said outlet section and connected to said pressure responsive means, said plate interposed between said valve means and outlet and having at least one orifice restricting flow therebetween, whereby said plate and said at least one orifice is effective in response to flow between said valve means and outlet above a predetermined value to effect the adjustment of said valve means by said pressure responsive means.

14. A regulator for controlling the flow of a pressurized fluid from a source thereof to a manifold, said regulator comprising a casing having inlet and outlet sections, pressure reducing means for maintaining substantially uniform pressure in the inlet section, second pressure reducing means for reducing the pressure of fluid flowing to the outlet section, orifice means between the outlet section and an outlet to the manifold for producing a pressure differential between the outlet section and the outlet only when the flow rate is above a predetermined value, and means responsive to said pressure differential for further regulating the flow of fluid through said orifice means and thereby maintaining the fluid pressure in said outlet at a substantially constant value irrespective of the rate of flow of fluid to said outlet.

15. In a regulator for reducing the pressure and controlling the flow of a fluid from a source under pressure to an outlet, means for maintaining uniform pressure at the outlet with varying rates of flow, comprising a flow regulating valve, means for adjusting the valve in accordance with ambient pressure, and means for further adjusting the valve in accordance with the rate of flow through the outlet, including a valve-engaging member, and means responsive to said rate of flow for actuating said member.

References Cited in the file of this patent

UNITED STATES PATENTS

| | | |
|---|---|---|
| 847,944 | Hubner | Mar. 19, 1907 |
| 1,883,690 | Gilgenberg | Oct. 18, 1932 |
| 2,057,150 | Kehl | Oct. 13, 1936 |
| 2,137,025 | Niesemann | Nov. 15, 1938 |
| 2,313,149 | Jacobsson | Mar. 9, 1943 |
| 2,328,214 | Holmes | Aug. 31, 1943 |
| 2,534,959 | Deming | Dec. 19, 1950 |
| 2,535,893 | Branson | Dec. 26, 1950 |
| 2,569,285 | Brown | Sept. 25, 1951 |
| 2,587,375 | Paulsen | Feb. 26, 1952 |
| 2,592,830 | Sneller | Apr. 15, 1952 |
| 2,608,200 | Stockman | Aug. 26, 1952 |